No. 680,915. Patented Aug. 20, 1901.
H. GREEN.
MANUALLY OPERATED ATTACHMENT FOR MOWERS.
(Application filed May 25, 1900.)

(No Model.) 2 Sheets—Sheet 1.

WITNESSES
J. H. Bluch
Fred T. Day

INVENTOR
Henry Green,
By L. M. Thurlow,
Atty.

THE NORRIS PETERS CO., PHOTO-LITHO., WASHINGTON, D. C.

No. 680,915. Patented Aug. 20, 1901.
H. GREEN.
MANUALLY OPERATED ATTACHMENT FOR MOWERS.
(Application filed May 25, 1900.)

(No Model.) 2 Sheets—Sheet 2.

WITNESSES
J H Klusch
Fred T. Day

INVENTOR
Henry Green
By L. M. Thurlow,
ATTY.

UNITED STATES PATENT OFFICE.

HENRY GREEN, OF PEKIN, ILLINOIS, ASSIGNOR TO THE ACME HARVESTER COMPANY, OF SAME PLACE.

MANUALLY-OPERATED ATTACHMENT FOR MOWERS.

SPECIFICATION forming part of Letters Patent No. 680,915, dated August 20, 1901.

Application filed May 25, 1900. Serial No. 17,999. (No model.)

*To all whom it may concern:*

Be it known that I, HENRY GREEN, a citizen of the United States, residing at Pekin, in the county of Tazewell and State of Illinois, have invented certain new and useful Improvements in Manually-Operated Attachments for Mowing-Machines; and I do hereby declare that the following is a full, clear, and exact description of the invention, which will enable others skilled in the art to which it appertains to make and use the same.

This invention relates to manually-operated grain-receiving attachments for reapers or mowers.

The object of the invention is to provide an ordinary mower with a device adapted to receive the grain and discharge it without the use of tools. Some operators prefer to use a common mower instead of a harvester and binder and bind the grain by hand. This is especially true in foreign countries; and it is my purpose to provide an arrangement for carrying the grain and delivering it in the easiest and most efficient manner and without requiring much of the operator's attention. I am aware that tables have been used on mowers, the same being adapted to receive the grain, which is pushed thereon by means of a rake in the hands of the operator; but this requires two men, one to drive and the other to take care of the grain. When a sufficient quantity of the grain has been received upon the table or platform, it is raked off upon the ground and a new load taken on. The advantage of my arrangement is that only one man is necessary, and he is enabled to drive and take care of the load at the same time.

Figure 1:
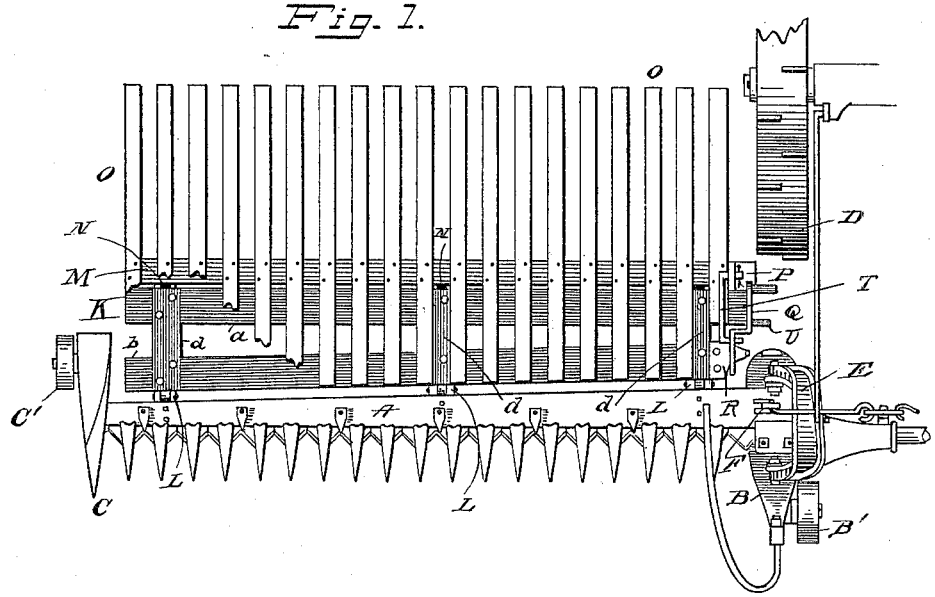
Figure 2:
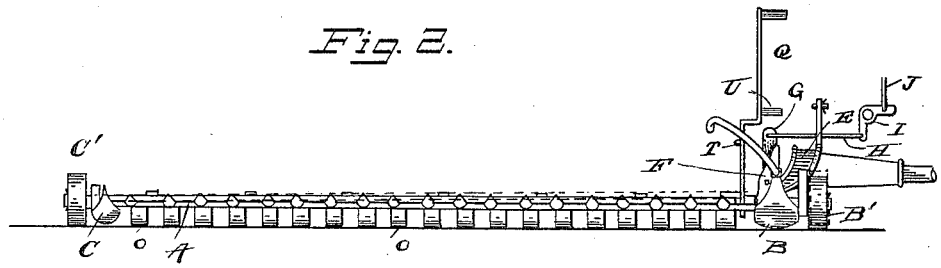
Figure 3:
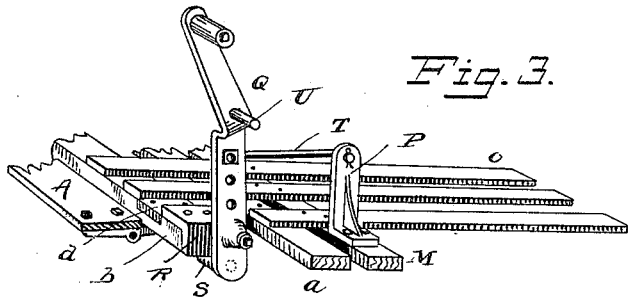
Figure 4:
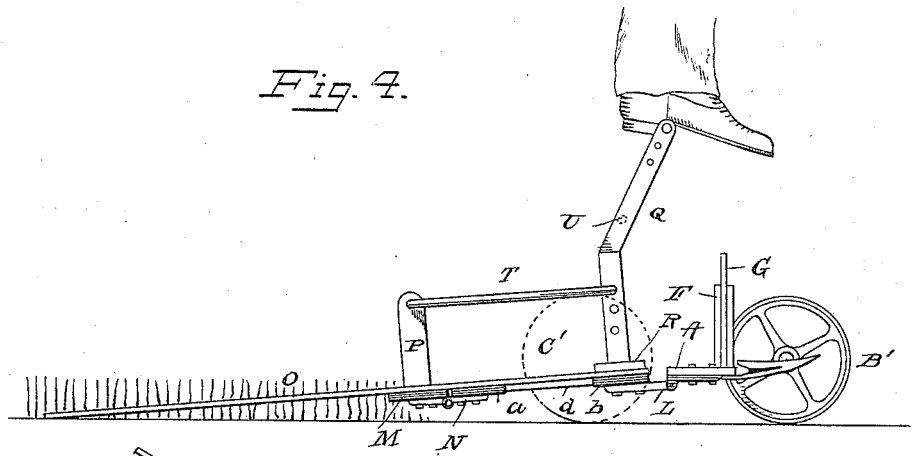
Figure 5:
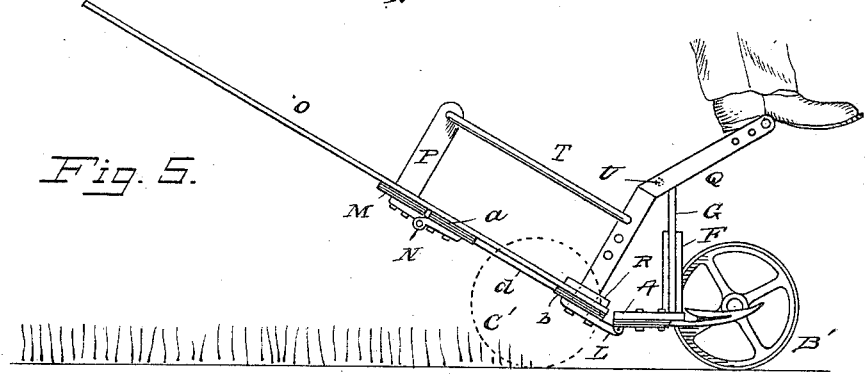
Figure 6:
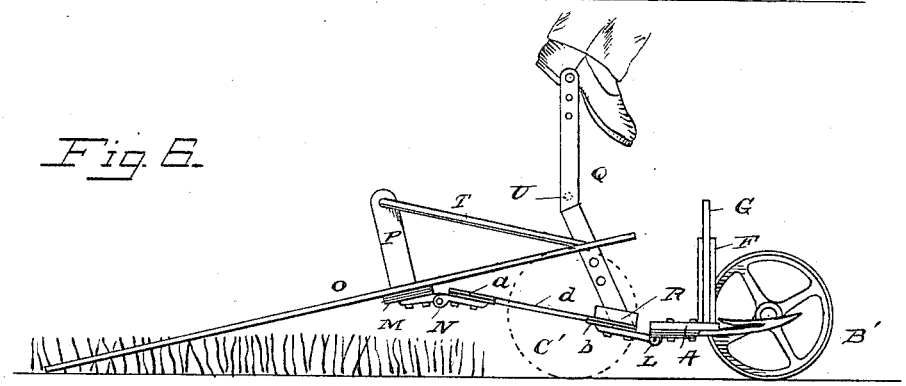

In the accompanying drawings, Figure 1 is a plan view of the finger-bar of a mower or reaper, showing attachment connected therewith. Fig. 2 is a front elevation of the same. Fig. 3 is a perspective view of a portion of my improved device. Fig. 4 is an end elevation showing position of the finger-bar, sickle-guards, and carrying-wheels, and my invention attached to the former. Fig. 5 shows the attachment in position for receiving its load. Fig. 6 is a view of the same in position for dumping.

In the various figures, A is the finger-bar. B is the inner shoe, which carries said bar, and C is the outer shoe.

D is one of the carrying-wheels of the mower.

E is a yoke attached to the mower, which carries the shoe B. A U-shaped bracket F is rigidly secured to the shoe B, to which is pivoted a gag-post G. To the upper end of the post is pivotally connected a rod H, which in turn is loosely connected to a bell-crank I, pivoted to a projection on the shoe B, as shown in Fig. 1. A rod J is connected at one end with the free end of said crank and the other to an operating-lever. (Not shown.) Said lever when moved in the proper direction serves to raise the cutter-bar to a vertical position when desired. However, I lay no claim to this portion of the machine.

I will now describe the construction and operation of my invention. A frame K, composed of the bars $a$ and $b$ and cross-slats $d$, is loosely connected with the cutter-bar A by hinges L. To this frame is also attached a bar M by means of hinges N. Securely attached to the said bar M is a series of slats O. The said slats are placed at right angles to the finger-bar and project forward from the point of attachment with the said bar M over the frame K, with their extreme ends substantially flush with the forward edge of said frame. The inner projecting end of the bar M carries an upright post P. To the inner end of the bar $b$ of the platform K is pivoted a foot-lever Q by means of a metal support R. The lower end of the said foot-lever Q carries a stud S, as shown in Fig. 3, adapted for contact with the said support R, as will be hereinafter described. A rod T is pivoted to the lever Q at one end and at the other to the top of the post P, as shown. A carrying-wheel B' is attached to the shoe B at its forward end, and a wheel C' is attached to the outside shoe or guard C at the rear end thereof. These wheels serve to carry the finger-bar and table, but need not be employed unless desired. The act of turning around in the field will be made easier by raising one of the wheels from the ground. Otherwise a drag on the platform will result. I accomplish this by raising the inner wheel by a movement of the lever, which has connection with the gag-post G, already described. This will lift the wheel B from the ground, as shown by dotted lines in Fig. 2. A continued movement of the same lever would, as a matter of course, raise the finger-bar and platform to the vertical position; but I merely raise the inner end of said bar sufficiently to elevate the said wheel B' for the purposes described. While cutting grain in the field, the operator's foot is kept on the lever Q, throwing it forward to elevate the slats O at an angle, as shown in Fig. 5. The grain as it falls is caught by the slats O, and when a sufficient load has been received the operator merely lowers the device by a movement of his foot in a rearward direction, as shown in Fig. 4. Continuing said rearward movement of the lever, the rod T pushes the post P backward, thus elevating the slats at an opposite angle to that described for receiving the load. The stop S is employed merely to prevent the lever Q moving too far in a rearward direction and raising the slats too high when operating the platform, as in Fig. 6. During the forward motion of the mower, as the slats attain the position shown in Fig. 4, the stubble projecting through the slats will catch the bunch of grain and tend to drag it from its position, and when the position shown in Fig. 6 is reached the load is completely delivered by reason of the steep incline. The angle illustrated in Fig. 5 is somewhat exaggerated; but it is so shown to make the idea fully understood. It is only necessary to have the angle such that the grain will fall upon the slats without dragging off behind while the machine is in motion, this being readily determined as soon as the work is begun. I provide a projecting stud U on the lever Q, adapted to engage the gag-post G, whereby the angle at which the slats are raised may be limited. Other means for accomplishing this may be employed. However, the operator can elevate the device to suit himself, if desired, without the use of such a stop.

I desire to make it understood that I do not depend on the stubble underneath the slats for delivering the grain, as the angle attained by means of the foot-lever meets all requirements. I may employ an entirely-different construction in making a device of this nature, as is obvious.

The tilting of the finger-bar is not interfered with in any way, and the grain may be cut, therefore, as low or as high as desired.

I am aware that devices of this nature are not new; but my particular construction is new, and

What I claim is—

1. A manually-operated grain-carrier for mowing-machines, consisting of a platform hinged to the finger-bar of a mower, a table hinged to said platform consisting of a series of slats projecting forward across the platform to near the finger-bar and the rear ends thereof projecting rearwardly from said platform, substantially as described and shown and for the purposes set forth and means for operating the said carrier.

2. A manually-operated grain-carrier for mowing-machines consisting of a platform hinged to the finger-bar of a mower, a table hinged to the said platform, consisting of a series of slats arranged in fixed relation to one another and extending forward across the platform to near the finger-bar, whereby the grain is caught thereon and kept clear of said platform, and when raised at an angle rearwardly the grain will slide off said table upon the ground and means for operating the said platform and table.

3. A manually-operated grain-carrier consisting of a platform, or frame K, hinged to the finger-bar of a mower, a bar M hinged to said platform K, a series of slats secured to said bar M and projecting forward across the said platform K and rearwardly therefrom, and means on the said platform for raising the same at an angle upward and rearward to receive grain from the sickle-bar and afterward tilting it at an opposite direction to deliver the load.

4. A manually-operated grain-carrier for mowers consisting of a frame K, hinged to the finger-bar of the mower, a bar M, hinged to the frame K, a series of slats O secured to the bar M, a post P secured to one end of the said bar, a lever Q pivoted to the frame K substantially as shown, an arm T having pivotal connection with the said post and lever and arranged whereby a movement of the lever in one direction will raise the carrier to catch the grain from the sickle-bar, and an opposite movement will cause the grain to be delivered at the rear of the mower upon the ground.

5. The combination with the finger-bar of a mower, of the frame K composed of the bars a and b hinged to said finger-bar, the bar M hinged to said frame K, the slats O secured to said bar M at right angles thereto and projecting forward across the frame K to near the finger-bar, the post P on the bar M, the lever Q on the frame K, the arm, or link, T between the said post and lever and the stud S on the lower end of said lever all arranged substantially as and for the purposes set forth.

6. A manually-operated grain-carrier for mowers comprising a platform hinged to the rear of the finger-bar of a mower, a series of slats, or fingers, O supported on a suitable carrier, the latter having hinged connection with the said platform, said slats projecting forward across the platform, and projecting rearwardly to bear upon the ground when delivering grain, an operating foot-lever mechanism for the carrier consisting of a lever Q pivotally secured to the forward edge of the platform adjacent to the finger-bar, a post P secured to the slat-carrying portion and a connection T between the lever and post, the same adapted to tilt the slats in one direction or the other according to the direction of movement of the said lever for the purposes herein set forth and described.

7. A manually-operated grain-carrier for mowers comprising a platform hinged to the rear of the finger-bar of a mower, a series of slats, or fingers O supported on a suitable carrier, the latter having hinged connection with the said platform, said slats projecting forward across the platform, and projecting rearwardly to bear upon the ground when delivering grain, an operating foot-lever mechanism for the carrier consisting of a lever Q pivotally secured to the forward edge of the platform adjacent to the finger-bar, a post P secured to the slat-carrier portion, a connection T between the lever and the post the same adapted to tilt the slats in one direction or the other according to the direction of movement of the said lever for the purpose set forth, and a stud S on the lower end of the said lever G for engaging the under side of the platform for assisting in operating it as described.

8. In a manually-operated grain-carrier for mowing-machines, the combination of the bars $a$, $b$, and $d$ forming a platform; the latter hinged to the finger-bar of a mower, a table consisting of the slats O at right angles to the platform, a bar M, to which said slats are secured, lever Q on the platform, the post P on the bar M, the rod T connecting said lever and post, a stop S on the said lever Q, and a stop U on said lever for engaging a fixed portion on the finger-bar for limiting the movement of the lever and carrier, all arranged substantially as herein set forth and for the purposes described.

In testimony whereof I affix my signature in presence of two witnesses.

HENRY GREEN.

Witnesses:
H. C. WOO,
W. H. BINNIAN.